UNITED STATES PATENT OFFICE.

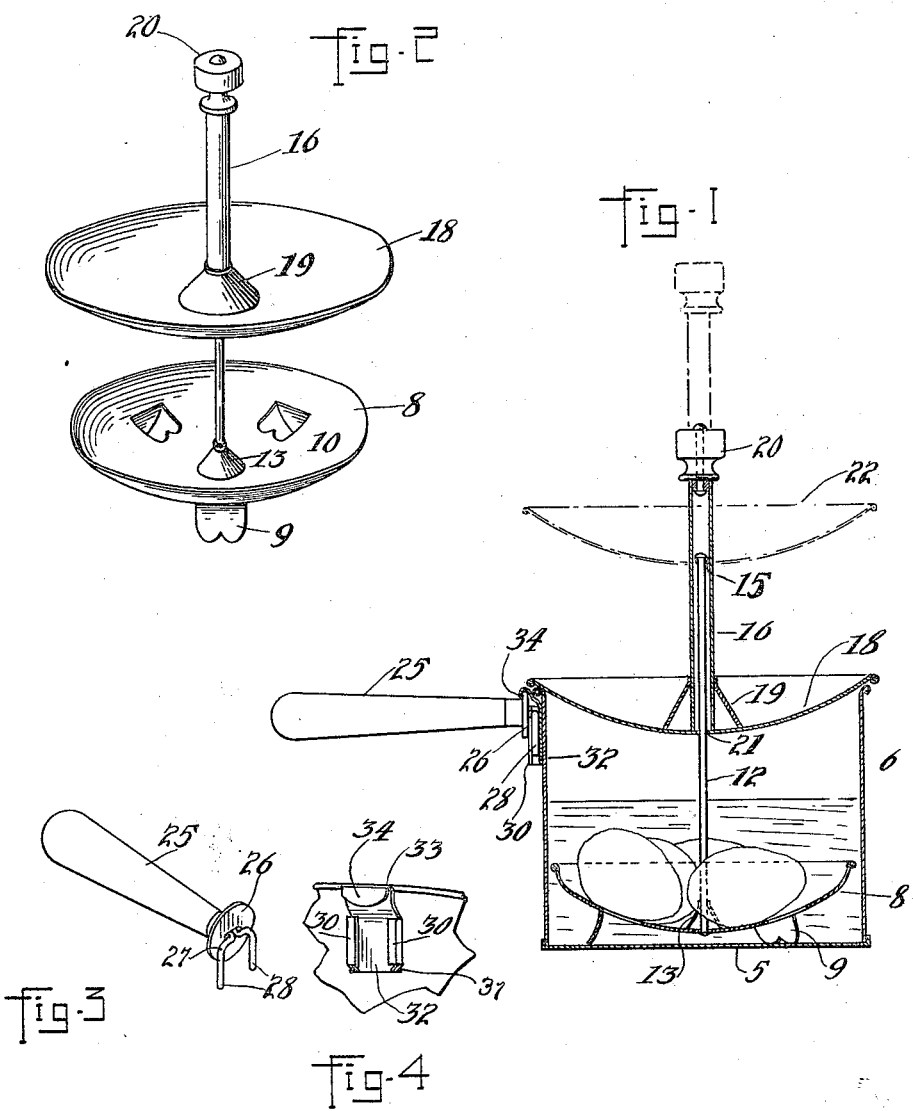

WILLIAM L. DEMING, OF SALEM, OHIO.

EGG-BOILING DEVICE.

1,193,523.    Specification of Letters Patent.    Patented Aug. 8, 1916.

Application filed April 1, 1914. Serial No. 828,659.

*To all whom it may concern:*

Be it known that I, WILLIAM L. DEMING, a citizen of the United States, residing at Salem, in the county of Columbiana and State of Ohio, have invented a certain new and useful Improvement in Egg-Boiling Devices, of which the following is a full, clear, and exact description, reference being had to the accompanying drawings.

The general object of this invention is to provide a simple, compact and conveniently operated device for boiling eggs.

More specific objects are to provide a convenient means for safely placing the eggs in boiling water in a receptacle, and conveniently removing them therefrom without the usual danger of cracking the eggs or burning the fingers.

Another object is to provide a device by which the eggs may be conveniently transported from the boiling receptacle to the table and from which device the eggs may conveniently be served without removing them to a separate dish or receptacle.

My device comprises a cover for the receptacle and a tray carried by the cover for supporting the eggs in the boiling water, allowing the eggs to be removed therefrom by raising the cover.

Another object of the invention is to so shape the cover portion that it may fit various sizes of openings, thereby providing for boiling eggs in a receptacle other than the receptacle particularly adapted therefor, as for example, the eggs may be boiled in an ordinary tea-kettle by suspending the eggs therein, the cover closing the opening in the top thereof in place of the usual cover.

My invention is hereinafter fully described in connection with the accompanying drawing and the essential characteristics are set forth in the claims.

Referring to the drawings, Figure 1 is a central vertical section through the device showing the position of parts when in use; Fig. 2 is a perspective view of the cover and tray portion removed; Fig. 3 is a perspective view of the handle removed, and Fig. 4 is a perspective view of a portion of the side of the receptacle showing the means for holding the handle thereon.

Referring to the drawings, 5 indicates the bottom, and 6 the cylindrical wall of a receptacle in which the eggs may be boiled.

8 designates a saucer-shaped tray preferably made of sheet metal and having downwardly extending feet 9 pressed from the metal of the tray and left integral therewith, forming openings 10, allowing the free circulation of the water so necessary to the proper boiling of eggs. At the center this tray is rigidly attached to a vertically extending rod 12, being preferably braced by a conical-shaped member 13, soldered to the tray and to the rod, as shown. At its upper end the rod is provided with a button or head 15, vertically slidable in a tube 16, rigidly mounted in the center of a saucer-shaped cover 18, thus providing a sliding connection between the two trays. This tube is also preferably braced by a conical-shaped member 19, soldered or otherwise secured to the tube and to the cover. At the upper end of the tube, is mounted a suitable knob 20, by which the cover may be raised and by which the entire device may be carried. The head 15 prevents the separation of the cover from the tray by engaging the cover at the bottom of the tube, which cover or upper tray is provided at this point with an opening 21 fitting the rod 12, and through which it is slidable. Thus the upper tray and the rod provide means for suspending the lower tray, and the rod and stop at the upper end of the tube provide means for supporting the upper tray. It will be seen that the cover may be raised from the receptacle to ascertain if the water is boiling without disturbing the tray. The cover is shown in its raised position in dot and dash lines at 22, in Fig. 1.

To boil the eggs, with my device, they may be conveniently placed in the tray while resting on the table, the tray with the eggs then transferred to the receptacle of boiling water, into which they are lowered. Thus it will be seen that there is no danger of cracking the eggs while placing them into the receptacle, and as the tray is carried preferably by the handle or knob 20, it is impossible to burn the hands by contact with the hot water or with the receptacle. It will be seen that the eggs may be just as conveniently removed, the water draining from the tray through the openings 10, the tray then placed upon the table with the feet resting thereon, and the eggs conveniently served therefrom. If desired, the saucer-shaped cover 18, may be used as a receptacle for the shells of the eggs.

It will be noted that the diameter of the tray 8 is considerably smaller than the cover, which provides for using this device to boil eggs in any receptacle having an opening large enough to admit the tray but too small to admit the cover. I prefer to make the relative sizes of the tray and cover such that the eggs may be conveniently boiled in an ordinary tea-kettle, the tray being small enough to pass through the opening in the top and the cover large enough to rest on the edge thereof. The shape of the cover is such that it automatically positions itself in the opening. I prefer to ship these devices in cylindrical cartons just large enough to receive the cover 18 and just high enough to come above the knob 20, in its lowest position. Accordingly, it is necessary to provide a removable handle which may be placed within the receptacle and conveniently applied by the purchaser. The handle indicated at 25, is provided with a disk 26. Two stiff wire prongs 28 are brought together at their upper ends and then inwardly through the disk, and are secured in the handle. These prongs are adapted to engage inwardly turned ears 30 of a clip 32, secured to the side of the receptacle near its upper edge. At the lower ends of the ears are formed inward projections 31, adapted to engage the lower ends of the prongs when the handle is in position normally preventing the downward movement of the same. Formed on this clip is an upwardly extending portion 33, bent forwardly and having its edge bent downwardly forming a lip or flange 34, adapted to engage the edge of the disk 26, when the handle is in position as shown in Fig. 1. It will be seen that the handle may be readily attached to the receptacle by drawing the prongs 28 upwardly into engagement with the ears 30, until the disk 26 engages the flange 34, limiting its upward movement. Curved portions 27 of the prongs cause them to readily spring together to pass the projections 31 and when the handle is in position the prongs again spring outwardly, the lower ends of the same engaging these lips, thereby holding the handle against downward movement except when comparatively forcibly pressed downwardly by hand. In this position the handle is very rigid with the receptacle, as the ears 30 rest against the disk and flange 34, preventing the receptacle changing its angle with relation to the handle when being carried thereby, and it will be seen that the handle may be readily removed by merely pushing it downwardly until the upper portions are brought out of engagement with the ears 30.

Having thus described my invention, what I claim is:

1. In a device of the character described, the combination of an upper and a lower tray, a rod rigidly secured to the lower tray and rising from it, a tube rigidly secured to the upper tray and rising from it, the rod extending into the tube, a stop carried by the tube adapted to engage the rod and enable it to support the upper tray, and means for preventing the rod drawing out of the tube, whereby the lower tray may be suspended.

2. In a device of the character described, the combination of a lower tray adapted to support and confine eggs, an upper tray saucer-shaped and adapted to support egg shells, a telescoping joint between the two trays provided with upper and lower stops allowing the distance between the trays to be changed while enabling the upper tray and lower stop to suspend the lower tray or the lower tray and upper stop to support the upper tray.

3. In a device of the character described, the combination of a vessel, a tray adapted to stand within the vessel and having supporting feet, a rod rising from such tray, a larger saucer-shaped tray adapted to constitute a cover for the vessel, and a limited sliding connection between the lower tray and the cover, such connection comprising the rod 12 and the stop 20, and enabling either tray to be supported by the other.

In testimony whereof, I hereunto affix my signature in the presence of two witnesses.

WILLIAM L. DEMING.

Witnesses:
   ARCHER W. RICHARDS,
   ALBERT H. BATES.

Copies of this patent may be obtained for five cents each, by addressing the "Commissioner of Patents, Washington, D. C."